United States Patent [19]

Schlosser et al.

[11] Patent Number: 5,036,832
[45] Date of Patent: Aug. 6, 1991

[54] ASH CATCHER ASSEMBLY FOR BARBECUE GRILL

[75] Inventors: Erich J. Schlosser, Barrington; J. Michael Alden, Palatine, both of Ill.

[73] Assignee: Weber-Stephen Products Co., Palatine, Ill.

[21] Appl. No.: 571,736

[22] Filed: Aug. 23, 1990

[51] Int. Cl.⁵ ............................................. F23J 1/00
[52] U.S. Cl. .................................. 126/243; 126/25 R
[58] Field of Search .............................. 126/242–245, 126/9 R, 25 R, 25 A, 9 R, 9 B; 220/300, 301, 630

[56] References Cited

U.S. PATENT DOCUMENTS

| 101,177 | 3/1870 | Stevenson | 126/245 |
|---|---|---|---|
| 1,055,311 | 3/1913 | Blount | 126/242 |
| 3,974,821 | 8/1976 | Storandt | 126/25 R |
| 4,741,322 | 5/1988 | Lin | 126/25 R |
| 4,763,640 | 8/1988 | Schnack et al. | 126/9 B |
| 4,926,841 | 5/1990 | Woolf | 126/243 |

FOREIGN PATENT DOCUMENTS 2417964 10/1979 France ............................ 126/25 R Primary Examiner—James C. Yeung
Attorney, Agent, or Firm—Wallenstein, Wagner & Hattis, Ltd.

[57] ABSTRACT

An ash catcher assembly (2) for catching ash and debris falling out through openings in the bottom (11) of a barbecue kettle (10) is disclosed. The assembly (2) is easily installed and is removably mounted on the bottom (11) of a barbecue kettle (10). The assembly (2) includes a cylindrical basket (90) for holding the ash that has an interconnected handle member (80) for gripping. Outwardly extending projections (81,84) of the handle member (80) extend outwardly through openings (94,93) in the basket (90) and cooperate with a cylindrical mounting ring (60). The mounting ring (60) has a plurality of slots (62,65) for receiving the projections (81,84). The assembly (2) is secured to the kettle (10) by a transverse mounting band (51) that is fastened to the bottom (11) of the kettle (10) and connected to the mounting band (60).

12 Claims, 2 Drawing Sheets

U.S. Patent  Aug. 6, 1991  Sheet 1 of 2  5,036,832
FIG_1_
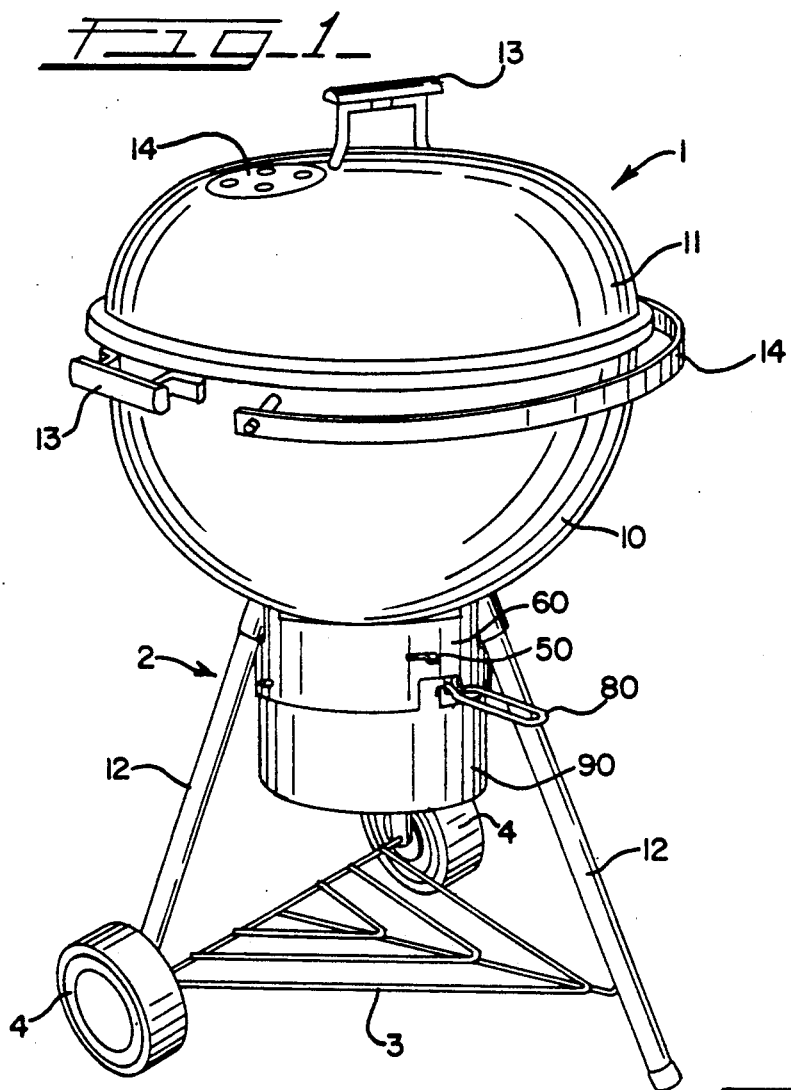
FIG_2_
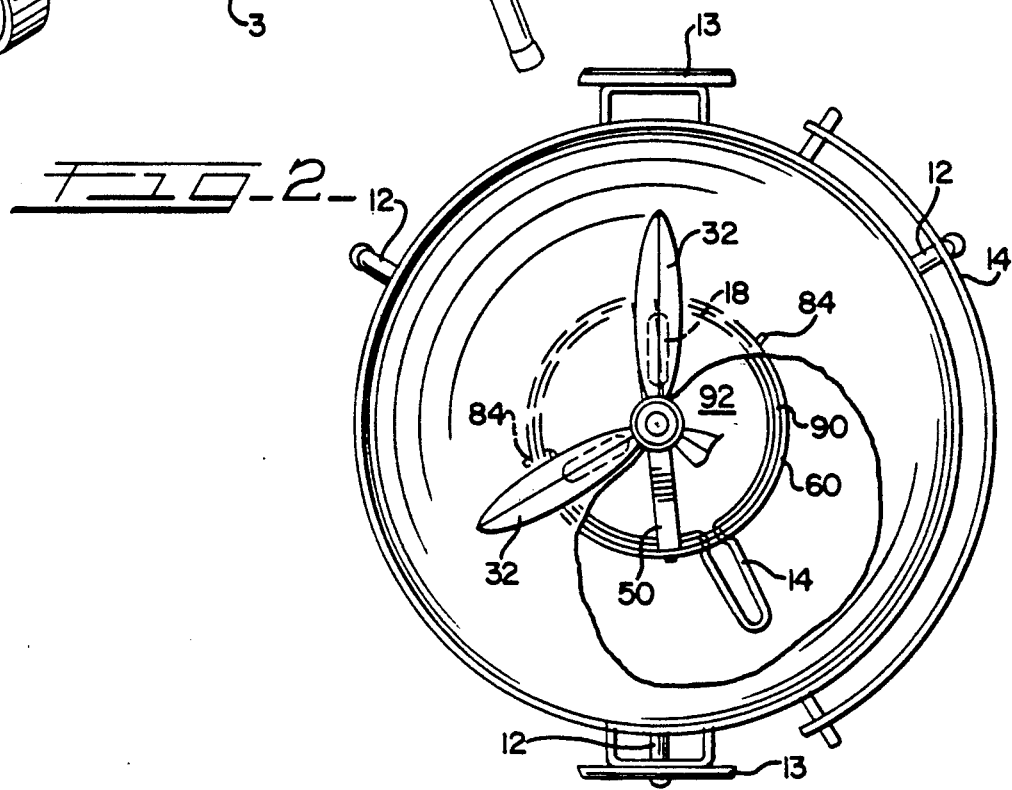

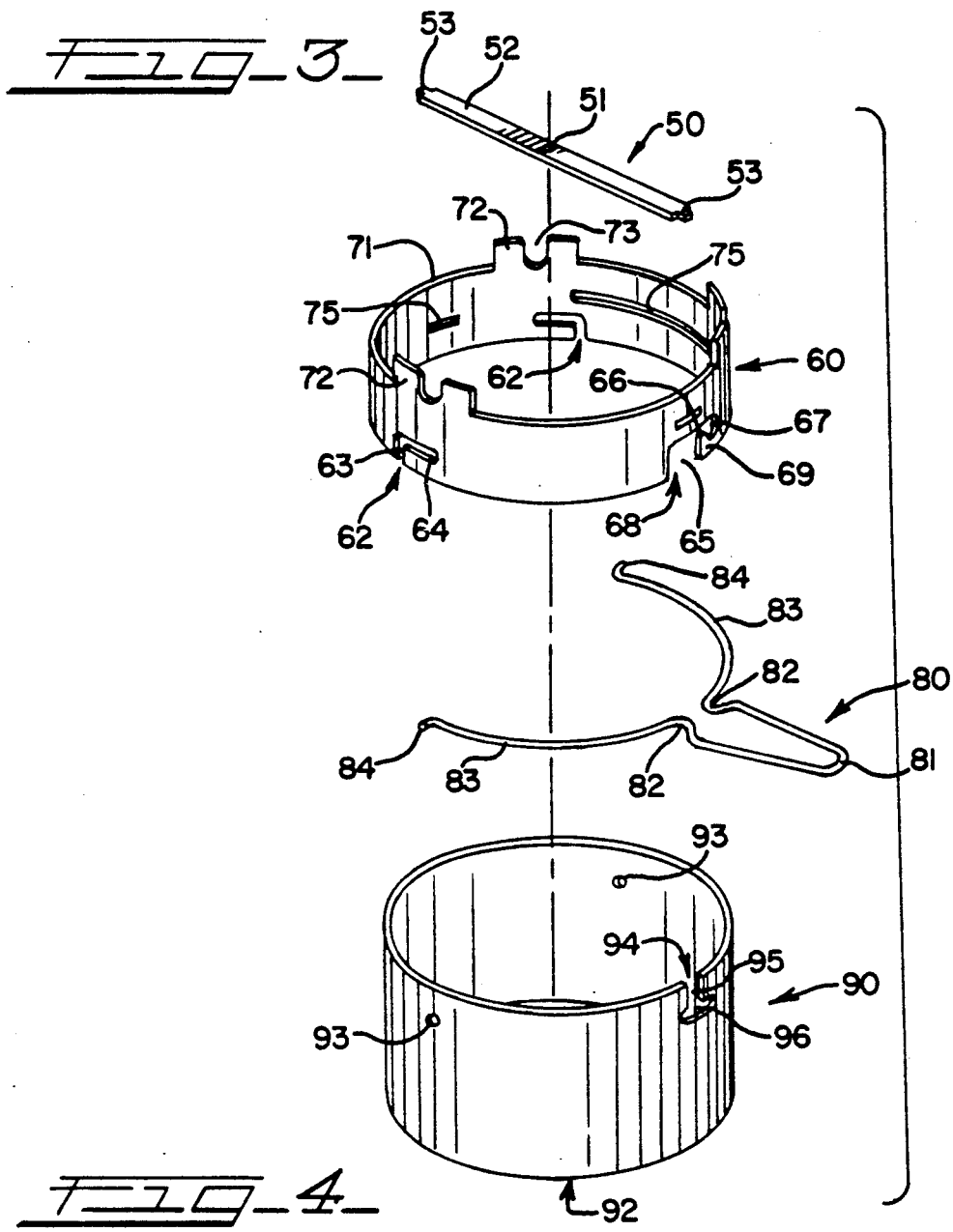
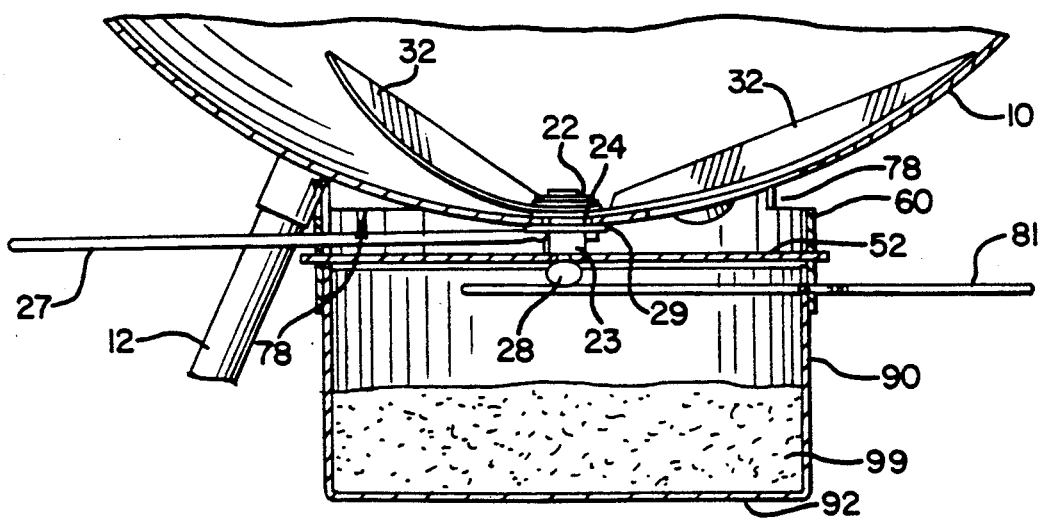

ASH CATCHER ASSEMBLY FOR BARBECUE GRILL

BACKGROUND PRIOR ART

Kettle-type grills are very widely used today. Presently, one of the most popular grills is being marketed by the Assignee of the present invention. This barbecue kettle consists of a generally semihemispherical bottom bowl that has a circular open top with a cooking grid slightly below the upper rim of the bowl. A generally semihemispherical top cover can be placed on the bottom bowl. Also, the bowl is supported on a tripod leg arrangement. This kettle configuration is a registered trademark of the Assignee of the present invention.

Barbecue kettles that are designed for burning charcoal as a fuel also have a second grid for supporting the charcoal below the cooking surface. Both the bowl and cover have vent openings to provide the necessary oxygen for combustion of the charcoal while the cover is closed.

One type of barbecue kettle that has received very favorable acceptance by consumers is disclosed in U.S. Reissue Pat. No. 33,091, owned by the Assignee of the present invention, which is sold under the trademark ONE-TOUCH ®.

During operation, the charcoal on the second grid burns, turns to ash, and falls to the bottom of the bowl. Also, grease or cooking fat, pieces of the food being cooked, chunks of hot coal and other things might fall to the bottom of the bowl. Openings are commonly located at the bottom of the bowl to let this material exit. A successful apparatus for scraping and disposing of this ash and debris from the bottom of the kettle and for controlling the air intake into the bottom of the kettle is disclosed in U.S. Pat. No. 4,416,248, also owned by the Assignee of the present invention.

It is an accepted practice to have a small curved plate or bowl spaced below the bottom of the kettle to catch the ash and debris that falls through the openings it the bottom. However, if there is any breeze or if the kettle is nudged or moved, it is possible for some ash and debris to not fall onto the plate or to fall out of the plate. This can pose a problem and a fire hazard if there is a risk of fire to the surrounding environment. For example, individuals living in apartment complexes with wooden balconies, campers and picnickers are almost always concerned about ash and debris escaping into the atmosphere. Further, it is inescapable that uncollected ash can, unfortunately, be messy and dirty. It is, therefore, desirable to provide a means for disposal of such.

SUMMARY OF THE INVENTION

An ash catcher assembly is developed which can catch ash and debris falling out through openings in the bottom of the barbecue kettle. It is also very easy to assemble and empty. Further, the ash catcher can be easily retrofitted onto previously made kettle grills. And, the present assembly can be easily disassembled to clean and store.

According to the primary aspect of the present invention, the ash catcher assembly of the present invention is removably mounted on the bottom of a barbecue kettle with openings in its bottom for permitting ash to fall therethrough. The assembly includes a cylindrical basket, opened at the top and closed at the bottom, for holding ash and other debris. A handle is connected to the basket for gripping and for interconnecting the basket to a mounting ring. The handle may be formed of wire that is bent in a generally C-shape so as to have two outwardly bent sections for engaging holes in the basket, curved portions following the contour of the interior of the basket and then extending outwardly through a T-shaped slot in the basket to provide a gripping section for handling the basket.

The handle's gripping section extends outwardly from the perimeter of the basket to interlock with a cylindrical mounting ring. The mounting ring has a diameter larger than that of the basket. The ring includes bayonet openings in its bottom for cooperating with the outwardly extending projections to removably hold the basket at three points. In particular, the bayonet openings are two L-slots for receiving the free ends of the wire that extend outwardly from the basket and one J-slot for receiving the handle's gripping section.

A transverse mounting band having an aperture therein is fastened by a thumb screw to the bottom of the kettle damper. And, an extension at each end of the mounting band is inserted into cooperating slots in the mounting ring.

Other advantages and aspect of the present invention will become apparent upon reading the following description of the drawings and the detailed description of the invention.

BRIEF DESCRIPTION OF DRAWINGS

FIG. 1 is a perspective view of a barbecue kettle with the ash catcher assembly made in accordance with the teachings of the present invention attached to it;

FIG. 2 is a top view of the bottom of the kettle of FIG. 1 partially removed;

FIG. 3 is an exploded perspective view of the ash catcher assembly made in accordance with the teachings of the present invention; and, FIG. 4 is a sectional side view of the bottom of the kettle and the attached ash catcher assembly made in accordance with the teachings of the present invention.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

The kettle-type barbecue grill 1, as shown in FIG. 1, is of a well-known configuration and has been sold by the Assignee of the present invention for more than 25 years. It comprises a generally semi-hemispherical bottom bowl 10 and a generally semi-hemispherical, removable cover 11. The bowl 10 and cover 11 are designed to fit snuggly together so as to form a substantially air-tight seal between them when the assembly is closed. The bowl and cover are preferably formed from porcelain-coated enamel. Handles 13 are provided at the top of the cover 11 and on the sides of the bottom 10. The kettle 1 is generally constructed in accordance with the teachings of U.S. Pat. No. 4,416,248. The bottom 10 is supported by the tripod leg arrangement 12 of the type shown disclosed in U.S. Pat. No. 3,538,906, both patents being incorporated herein by reference.

The kettle's legs 12 are secured to the bottom 10 to support the kettle at a convenient height.

The kettle 1 also includes a cover holder 14 which is attached to the exterior of the bottom 10 to hold the cover 11 while the kettle is opened. A suitable cover holder 14 is described in U.S. Pat. No. 4,777,927, which is also incorporated herein by reference.

A shutter-type damper 14 is rotatably secured to the cover 11 and employed to control the air flow through openings (not shown) in the cover, which is conventional in present commercial grills. A grate (not shown) is placed within the kettle and spaced a short distance above the bottom of the bowl to hold the solid fuel (such as charcoal briquettes), which are burned in the barbecuing procedure. Spaced above the grate and below the bowl's upper rim there is commonly a cooking grill (not shown) on which to place the food being cooked.

Wheels 4 can be connected to the legs 12 so as to easily move the entire assembly by just tilting and pushing or pulling it. A rack 3 can also be provided for holding items, such as the storage container or bag for the unused fuel.

During the cooking process the fuel within the kettle 1 burns and turns to ash which can, if left alone, collect on the bottom of the bowl section 10. A significant and highly successful method of removing the ashes is disclosed in U.S. Reissue Pat. No. 33,091, entitled "Ash Disposal Damper For Barbecue Kettle," and owned by the Assignee of the present invention and incorporated herein by reference.

Generally, there are air intake openings 18, typically three slots, in the bottom of the bowl 10. A central post 23 running through an opening 24 in the bowl 10 has a plurality of arms 32 extending radially therefrom. As shown in FIG. 4, post 23 has a washer 22 fused to the top thereof and which forms an enlarged head. The lower end of the post 23 has an internally threaded opening for receiving a thumb screw 28. A handle 27 is retained by the thumb screw 23. Thus, when the handle 27 is rotated by an individual, the arms 32 within the bowl 10 also rotate and scrape the bottom of the bowl 10 of debris and ash. The scraped material thereafter falls through the openings 18 in the bowl 10.

From the openings 18, the debris and ash falls into an ash catcher 100 which is attached to the bottom or bowl 10 of the barbecue-kettle 1. As shown generally in both FIG. 1 and FIG. 2, the ash catcher 100 comprises a basket 90, a handle 80, a mounting ring 80 and a mounting band 50. Each of these items is shown in more detail in FIGS. 3 and 4.

The basket member 90 is a cylinder that is opened at the top and closed at the bottom 92. Ash and debris 99 (shown in FIG. 4) that has fallen from the kettle 1 is stored in this basket member 90. The basket 90 further includes a plurality of openings 93,94 in its top portion for receiving a handle member 80 that is positioned, pinched and locked into the basket member 90. In the preferred embodiment, two opposed openings 93 near the top are circular and one opening 94 in the top is a T-slot, having a narrow section 95 leading into a wide section 92. The openings 93,94 are positioned so that if they were connected by a straight line, a isosceles triangle would be formed with the T-slot being the apex.

The handle member 80 is made of wire of sufficient diameter to be rigid when formed to the desired shape. This wire is bent so that it has a hoop portion 81 for gripping, two opposed inwardly bent sections 82 for cooperating and engaging the basket 90, two opposed curved portions 83 for following the contour of the basket's inner surface, and two outwardly extending free ends 84 for cooperating and engaging the basket 90.

The handle member 80 is attached to the basket 90 by first inserting each outwardly extending free end 84 into a corresponding opening 93 while maintaining the hoop portion 81 spaced above the basket 90. The hoop portion 81 is next pinched slightly, so as to push the opposed inwardly bent sections 82 towards each other, and rotated in a direction towards the T-slot 94 in the top of the basket 90. The inwardly bent sections 82 of the handle member 80 contact the narrow section 95 of the T-slot 94 and pass therethrough into the wide section 96 of the T-slot 94 wherein the inwardly bent sections 82 expand in a direction away from each other and frictionally engage the basket member 90. Consequently, the handle member 80 is secured to the basket 90.

Thus, three projections or portions of the handle member 80 extend outwardly from the perimeter of the basket member 90. These projections are the portions of the two outwardly extending knobs or free ends 84 threaded through and secured in the two openings 93 and the hoop portion 81 extending out from and secured in the T-slot 94.

While it is appreciated that the opposed curve sections 83 of the handle member 80 can be formed into many shapes, it has been found that forming these sections so as to follow the contour of the inner wall of the basket 90 is best. In this manner, the curved portions 83 hug the inside wall of the basket 90 and can frictionally engage this inner wall. Moreover, this arrangement all but eliminates both the possibility of hot debris falling and standing directly on the handle member 80 and the chances of an individual gripping it getting burned therefrom.

In addition, the handle to the basket need not be a separate member. A handle can be permanently attached, such as by welding, or made an integral part of the basket. However, having a detachable handle permits one to ship and store the entire assembly in a smaller space, and also facilitates the cleaning of the assembly.

As generally illustrated in FIG. 1, the basket 90 is removably attached to a mounting ring 60. The details regarding this mounting ring 60 are shown in FIG. 3. Specifically, the mounting ring 60 is an open ended cylindrical member that has a diameter larger than that of the basket 90. This permits the basket member 90 to fit within and to cooperate with the mounting ring member 60. The engagement between these two members is by bayonet locking means. In particular, the mounting ring 60 has bayonet openings 62,68 in its bottom for receiving and cooperating with the outwardly extending projections 81,84 of the handle member 80 projecting from the basket 90. The mounting ring 60 has three slots 62,63 cut out of the lower portion thereof. Two slots 62 are generally L-shaped and a third slot 68 is generally J-shaped. The L-slots include a vertical neck section 63 that leads into a horizontal portion 64. And, the J-slot includes a first vertical neck portion 65, a horizontal portion, a second neck portion. A thumb 69 is thusly formed between the first and second neck sections 65,67.

Two further apertures are cut into the mounting ring 60 for attaching and holding the ring 60 to the bowl 10 of the kettle 1. Attachment is accomplished by having a transverse mounting band 50 comprising a main strip 52 with an extension 53 at each end thereof and a central aperture 51 therein coupled with the mounting ring 60. Specifically, the extension 53 is threaded into a corresponding band aperture 75 in the mounting ring 60. While it is recognized that the band 50 must be flexible enough so that it may bowed for the threading discussed above, the transverse band 50 must also be rigid and strong so as to support the mounting ring 60, the basket 90 with a handle 80, all of the ash collected within the basket.

Alternatively, one band aperture 75 may be made larger or longer than the other so that the mounting band 50 can be fitted into the mounting ring 60 without bending the band 50. For example, each extension 53 of the band 50 can be put into a aperture 75 and one side, i.e., extension, can be rotated to fit into the ring 60.

The band 50 is attached to the kettle by a thumb screw 28. The thumb screw 28 that is initially threaded into the post 23 is removed and the band 50 is put under the bowl 10. This same thumb screw 28 is then threaded through the aperture 51 of the band 50 and re-engaged with the post 23.

Once the mounting ring 60 has been connected to the kettle's bottom 10, the ash catcher basket 90 is easily put on or taken off the mounting ring 60. Mounting the basket 90 to the ring 60 is accomplished by first gripping the hoop portion 81 of the handle 80 and positioning the basket 90 so that the hoop portion 81 of the handle member 80 is located directly below the J-slot 68 in the mounting ring and each outwardly extending free end 84 of the handle member 80 is directly below a L-slot. While maintaining a grip on the hoop 81, the basket 90 is next mounted to the ring 60 in a bayonet-type action, i.e., push and rotate. Specifically, the extending free ends 84 and the hoop portion 81 are pushed up through the neck portions 63,65 of the L-slots and the J-slot, respectively. The basket 90 is then rotated or twisted so that the free ends 84 rest on the ledges formed by the horizontal portions 64 of the L-slots. Concurrently, the hoop portion 81 is rotated into and through the horizontal portion 66 of the J-slot 68 and into the second neck portion 67 where it rests. The thumb 69, formed by the J-slot 68, acts as a barrier to any unwanted rotating of the hoop 81, and, consequently, of the basket 90. The basket 90 is thus held and locked in the mounted position, shown in FIGS. 1, 2 and 4.

If, for example, someone inadvertently nudges the basket 90 while it is mounted to the ring 60, it will not dismount or disengage. To be disengaged, the basket 90 must be simultaneously lifted and rotated. For example, while the basket is rotated, and the free ends 84 are sliding on the ledge formed by the horizontal portions 64 of the L-slots, the hoop 81 projecting outwardly from the basket 90 and initially resting in the second neck portion 67 of the J-slot, must be lifted over and rotated around the thumb 69. The free ends 84 and hoop 81 will then slide downwardly through their respective neck portions 63,65 to free the basket 90 from the ring 60.

To further prevent ash from escaping the assembly, the upper ledge 71 of the mounting ring 60 can be shaped to follow the contour of the kettle's bowl 10. This ledge 71 can further include posts 72 and open channels 73 to accommodate the kettle's legs 12. In this manner the gap 78 between the upper ledge 71 and the bowl 10, which permits air to pass through the assembly 2 and openings 18 into the bottom of the bowl section 10, is reduced. This reduction of the gap 78 minimizes the probability and amount of ash escaping from the assembly through the gap into the surrounding atmosphere.

A handle slot 75 is further provided in the ring 60 to accommodate the handle 27, and its movement, used in conjunction with the kettle's damper system.

While the specific embodiments have been illustrated and described, numerous modifications come to mind without significantly departing from the spirit of the invention and the scope of protection is only limited by the scope of the accompanying claims.

We claim:

1. An ash catcher assembly for removably mounting on the bottom of a barbecue kettle, the kettle having at least one opening in its bottom for permitting ash to fall therethrough, comprising:
   a cylindrical basket for holding said ash with a handle member for gripping, said basket further having bayonet locking means;
   a cylindrical mounting ring having a diameter larger than said basket with bayonet openings in its bottom for cooperating with said basket's bayonet locking means for removably holding said cylindrical basket; and,
   mounting means for interconnecting said cylindrical mounting ring to the bottom of the kettle.

2. The ash catcher assembly as defined in claim 1, wherein said basket's bayonet locking means is a plurality of outwardly extending projections and said ring's bayonet openings is a plurality of slots for receiving said outwardly extending projections.

3. The ash catcher assembly as defined in claim 2, wherein said ring's slots are at least two L-slots and one J-slot in the bottom of said ring.

4. An ash catcher assembly for removably mounting on the bottom of a barbecue kettle, the kettle having at least one opening in its bottom for permitting ash to fall therethrough, comprising:
   a cylindrical basket for holding said ash with a handle member for griping, said basket further having a plurality of outwardly-extending projections, said outwardly-extending projections being sections of a handle member interconnected to said basket that project through openings in the top portion of said basket and extend out beyond the perimeter of said basket, one of said sections of said handle member being a hoop portion for gripping and one of said openings in said basket being a cooperating T-slot,
   a cylindrical mounting ring having a diameter larger than said basket with a plurality of slots in its bottom for receiving and removably holding said outwardly-extending projections of said basket, said slots being at least two L-slots and one J-slot in the bottom of said ring; and,
   mounting means for interconnecting said cylindrical mounting ring to the bottom of the kettle.

5. The ash catcher assembly as defined in claim 4, wherein said mounting means is a transverse mounting band having an aperture therein which is fastened to the bottom of the kettle and an extension at each end thereof, each said extension being inserted into cooperating slots in said mounting ring.

6. The ash catcher assembly as defined in claim 5, wherein said handle member interconnected to said basket is formed of a bent wire so as to have a hoop section for gripping, two inwardly bent sections for engaging said basket and cooperating with said T-slot, curved portions following the contour of the interior of said basket and a pair of outwardly extending free ends, also for cooperating with openings in said basket.

7. The ash catcher assembly as defined in claim 6, wherein said mounting ring has an upper ledge shaped to reduce the gap between said ring and said kettle.

8. An ash catcher assembly for removably mounting on the bottom of a barbecue kettle, the kettle having at least one opening in its bottom for permitting ash to fall therethrough, comprising:
- a cylindrical basket for holding said ash with an interconnected handle member for gripping,
- said handle member interconnected to said basket being constructed so as to have a section for gripping, two inwardly bent sections for engaging said basket, curved portions following the contour of the interior of said basket and a pair of outwardly extending free ends, also for cooperating with corresponding openings in said basket,
- said basket having bayonet locking means including a plurality of outwardly extending projections, said outwardly extending projections being the sections of said handle member that project through openings in said basket and extend beyond said basket's perimeter, one said section of said handle member being a hoop portion for gripping and said corresponding opening in said basket being a T-slot;
- a cylindrical mounting ring having a diameter larger than said basket with bayonet openings in its bottom for cooperating with said outwardly extending projections for removably holding said cylindrical basket, said bayonet openings being a plurality of slots for receiving said outwardly extending projections, said slots including at least two L-slots and one J-slot; and,
- transverse mounting means for interconnecting said cylindrical mounting ring to the bottom of the kettle, said mounting means being a mounting band having an aperture therein which is fastened to the bottom of the kettle and an extension at each end thereof, each said extension being inserted into cooperating slots in said mounting ring.

9. The ash catcher assembly as defined in claim 8, wherein said mounting ring has an upper ledge shaped to reduce the gap between said ring and said kettle.

10. An ash cather assembly for removably mounting on the bottom of a barbecue kettle, the kettle having at least one opening in its bottom for permitting ash to fall therethrough, comprising:
- a basket member that is open at the top and closed at the bottom, said basket member further including bayonet mounting means and handle for gripping;
- a handle member connected to said basket formed of a bent wire having at least two outwardly extending free ends and a hoop portion extending outwardly from the perimeter of said basket;
- a mounting ring disposed between said kettle and said basket;
- said ring having a diameter greater than that of said basket,
- said ring further having bayonet receiving means in its bottom portion for cooperating with said bayonet mounting means of said basket for removably holding said basket member; and,
- mounting means for connecting said ring to said kettle.

11. An ash catcher assembly for removably mounting on the bottom of a barbecue kettle, the kettle having at least one opening in its bottom for permitting ash to fall therethrough, comprising:
- a basket member that is open at the top and closed at the bottom, said basket member further including bayonet mounting means and a handle for gripping;
- a handle member connected to said basket formed of a bent wire having at least two outwardly-extending free ends and a hoop portion extending outwardly from the perimeter of said basket;
- a mounting ring disposed between said kettle and said basket, said ring having a diameter greater than that of said basket, said ring further having a plurality of slots in the bottom portion of said ring, two such slots being generally L-shaped and one such slot being generally J-shaped for cooperating with said bayonet mounting means of said basket; and,
- mounting means for connecting said ring to the kettle, said mounting means being a transverse mounting band element having an aperture for securing a fastening element therethrough and into the kettle, said mounting band element being threaded at each end through opposing slots in said ring.

12. The ash catcher assembly as defined in claim 11, wherein said mounting ring has an upper ledge shaped to reduce the gap between said ring and said kettle.

* * * * *

UNITED STATES PATENT AND TRADEMARK OFFICE
CERTIFICATE OF CORRECTION

PATENT NO. : 5,036,832
DATED : August 6, 1991
INVENTOR(S) : Erich J. Schlosser et al.

It is certified that error appears in the above-identified patent and that said Letters Patent is hereby corrected as shown below:

Column 1, line 4, insert:

Technical Field

The present invention relates generally to kettle-type barbecue grills and, more particularly, to ash catchers that can be attached to such grills.

Column 1, line 40, after "openings" delete "it" and insert --in--.

Column 2, line 25, after "and" delete "aspect" and insert --aspects--.

Column 3, line 49, after "ring" delete "80" and insert --60--.

Column 4, line 58, after "slots" delete "62,63" and insert --62,68--.

Column 5, line 7, after "may" insert --be--.

Column 6, line 41, after "for" delete "griping" and substitute --gripping--.

Signed and Sealed this

Thirtieth Day of March, 1993

Attest:

STEPHEN G. KUNIN

Attesting Officer

Acting Commissioner of Patents and Trademarks